(12) United States Patent
Zhang et al.

(10) Patent No.: US 10,080,217 B2
(45) Date of Patent: Sep. 18, 2018

(54) SYSTEM AND METHOD FOR USING SYNCHRONIZATION SIGNAL FOR DEMODULATION REFERENCE

(71) Applicant: ZTE (USA) INC., Richardson, TX (US)

(72) Inventors: Wenfeng Zhang, Plano, TX (US); Senbao Guo, Xi'an (CN); Yunfeng Sun, Xi'an (CN); Shuqiang Xia, Xi'an (CN)

(73) Assignee: ZTE (USA) Inc., Richardson, TX (US)

( * ) Notice: Subject to any disclaimer, the term of this patent is extended or adjusted under 35 U.S.C. 154(b) by 269 days.

(21) Appl. No.: 14/889,925

(22) PCT Filed: May 7, 2014

(86) PCT No.: PCT/US2014/037183
§ 371 (c)(1),
(2) Date: Nov. 9, 2015

(87) PCT Pub. No.: WO2014/182837
PCT Pub. Date: Nov. 13, 2014

(65) Prior Publication Data
US 2016/0119901 A1    Apr. 28, 2016

Related U.S. Application Data

(60) Provisional application No. 61/821,630, filed on May 9, 2013.

(51) Int. Cl.
*H04W 72/04* (2009.01)
*H04W 56/00* (2009.01)
(Continued)

(52) U.S. Cl.
CPC ......... *H04W 72/042* (2013.01); *H04L 5/0048* (2013.01); *H04L 5/0094* (2013.01);
(Continued)

(58) Field of Classification Search
None
See application file for complete search history.

(56) References Cited

U.S. PATENT DOCUMENTS

2014/0192775 A1* 7/2014 Li ..................... H04W 36/0072
370/331
2014/0301353 A1* 10/2014 Frenne ................... H04L 5/003
370/330

FOREIGN PATENT DOCUMENTS

JP         2015-508255        3/2015
WO    WO 2013/006379 A1      1/2013
WO       WO2013/119588       8/2013

OTHER PUBLICATIONS

R1-130096, Texas Instrument, Location of PSS/SSS on the New carrier Type, Feb. 1, 2013, 3GPP TSG RAN WG1 #72.*
(Continued)

*Primary Examiner* — Christopher Grey
(74) *Attorney, Agent, or Firm* — Perkins Coie LLP

(57) ABSTRACT

A method of using synchronization signal as demodulation reference signal is performed at an eNB in case that the demodulation reference signal is punctured by synchronization signal in a wireless communication network. The method comprises: determining whether there is a resource element collision between the demodulation reference signal and the synchronization signal; in accordance with a determination that there is a resource element collision between the two signals: using the synchronization signal as the demodulation reference signal in a PRB pair containing the synchronization signal; and transmitting the synchronization signal as the demodulation reference signal to a UE.

13 Claims, 8 Drawing Sheets

(51) Int. Cl.
*H04L 27/26* (2006.01)
*H04L 5/00* (2006.01)

(52) U.S. Cl.
CPC .......... *H04L 5/0096* (2013.01); *H04L 27/261* (2013.01); *H04W 56/0015* (2013.01); *H04L 5/0023* (2013.01)

(56) References Cited

OTHER PUBLICATIONS

R1-130306, HTC, Tranmissions of PSS-SSS and DM-RS in unsynchronized New carriers, Feb. 2013, 3GPP TSG RAN WG1 Meeting #72.*

ZTE, Inc., Communication Pursuant to Rules 161(2) and 162 EPC, EP14794391.4, Dec. 16, 2015, 2 pgs.

HTC, "Transmissions of PSS/SSS and DM-RS in Unsynchronised New Carriers," 3GPP TSG RAN WG1, #72, R1-130306, St Julian's, Malta, Jan. 28-Feb. 1, 2013, 4 pgs.

NTT DOCOMO: "Views on DL RS for New Carrier Type," 3GPP TSG WG1, Meeting #72, R1-130397, St Julian's, Malta, Jan. 28-Feb. 1, 2013, 4 pgs.

ZTE, Inc., Extended European Search Report, EP14794391.4, dated Feb. 28, 2017, 10 pgs.

ZTE, Inc., Communication Pursuant to Rules 70(2) and 70a(2), EP14794391.4, Mar. 17, 2017, 1 pg.

ZTE, Inc., Notice of Reasons for Rejection, JP2016-513048, dated Oct. 11, 2016, 5 pgs.

Hitachi Ltd., Performance Evaluation of DMRS for NCT, 3GPP TSG RAN WG1 Meeting #72bis, R1-131148, Apr. 15-19, 2013, 6 pgs.

HTC, Considerations on New DL DMRS Patterns in NCT, 3GPP TSG RAN WG1 Meeting #72bis, R1-131201, Apr. 15-19, 2013, 4 pgs.

Pantech, On PSS/SSS details for NCT, 3GPP TSG RAN1 #71, R1-125035, Nov. 12-16, 2012, 4 pgs.

Texas Instruments, Location of PSS/SSS on the New Carrier Type, 3GPP TSG RAN WG1 #71, R1-125225, Nov. 12-16, 2012, 2 pgs.

ZTE (USA) Inc., International Search Report, PCT/US2014/037183, dated Sep. 5, 2014, 3 pp. 54.

ZTE, Inc., International Written Opinion, PCT/US2014/037183, dated Sep. 5, 2014, 4 pgs.

ZTE, Inc., International Preliminary Report on Patentability, PCT/US2014/037183, dated Nov. 10, 2015, 5 pgs.

* cited by examiner

SYSTEM AND METHOD FOR USING SYNCHRONIZATION SIGNAL FOR DEMODULATION REFERENCE

CROSS REFERENCE TO RELATED APPLICATIONS

This Application is a United States National Stage Application filed under 35 U.S.C. § 371 of PCT Patent Application Serial No. PCT/US2014/037183 filed on May 7, 2014, which claims the benefit of and priority to U.S. Provisional Patent Application No. 61/821,630 filed on May 9, 2013, which is hereby incorporated by reference in its entirety.

TECHNICAL FIELD

The present application relates to wireless telecommunication networks and, in particular, to system and method to use synchronization signal in 3GPP Long Term Evolution Advanced (LTE-A) system as downlink reference signal for coherent demodulation of physical data channels.

BACKGROUND

Cell synchronization is the very first step when UE wants to camp on any cell, through which UE acquires physical cell identification (PCID), time slot and frame synchronization. Such parameters enable UE to read system information blocks from a particular network. During cell synchronization, UE tunes its radio by turning to different frequency channels depending upon which bands it is supporting. Assuming that it is currently tuned to a specific band/channel, FDD UE first finds a primary synchronization signal (PSS) located in the last OFDM symbol of the first time slot of the first subframe (subframe 0) of a radio frame as shown in FIG. 1. PSS enables UE to be synchronized on subframe level. PSS is repeated in subframe 5, which means that UE is synchronized on a 5-ms basis since each subframe is 1-ms. Next, FDD UE finds a secondary synchronization signal (SSS). As shown in FIG. 1, SSS symbols are also located in the same subframe where PSS is found but within the symbol immediately before PSS. Once UE knows the PCID for a given cell, it also knows the location of cell reference signals, which are used in channel estimation, equalization, cell selection/reselection and handover procedures. For TDD UE, the synchronization process is similar to the above-mentioned procedure except that PSS is located at the third OFDM symbol in subframes 1 and 6, and SSS is located at the last OFDM symbol in subframes 0 and 5.

The primary and secondary synchronization signals are defined in LTE to serve UE's initial synchronization and cell search. Both PSS and SSS occupy the central 72 subcarriers within system bandwidth, and are both transmitted once per 5-ms or 5 subframes. Note that the occupied 72 subcarriers include 10 reserved (unused) subcarriers that are evenly located at the two ends of 72 subcarriers. The number of subcarriers containing active PSS/SSS signal is 72−10=62.

In wireless communication system, the downlink reference signals are set up to provide reference to a mobile station (also called "UE") for channel estimation used in coherent demodulation of data channels. In LTE Rel-8 specification, this type of downlink reference signal is called cell-specific reference signal (CRS). CRS is used by UE to compensate the downlink frame for channel frequency response and cross-channel effects so that the signal can be demodulated. With up to four ports (ports 0~3) on CRS, the base station (also called "cell" or "eNB") needs to inform UE of precoding matrix being used in MIMO transmission on physical downlink shared channel (PDSCH). In LTE Rel-10 specification, UE-specific demodulation reference signal (DMRS) is defined on up to eight ports (ports 7~14) to provide transparent precoding in MIMO transmission on PDSCH. Both CRS and DMRS are defined on logical antenna ports, and the precoding on PDSCH and the accompanied demodulation reference signals map transmission from the logical antenna ports to physical antenna ports. Starting from LTE Rel-11, DMRS is also used as demodulation reference signal for enhanced physical downlink control channel (EPDCCH). EPDCCH has a single layer transmission, but may use any ports from logical antenna ports {107,108,109,110}. The resource allocation patterns for both Rel-8 CRS and Rel-10&11 DMRS are defined per physical resource block (PRB) pair, as shown in FIG. 2. In one normal cyclic prefix (CP) configuration, one PRB pair contains 12×14 resource elements (RE) in 2-D time-frequency resource area across over 12 subcarriers and 14 OFDM symbols. The time duration of one PRB pair is 1-ms, which is also called one subframe in LTE. Ten continuous subframes, indexed 0~9, constructs one radio frame.

As shown in FIGS. 1 and 2, PSS/SSS and DMRS may map to the same resource element (RE), which causes a resource element collision. Up to LTE Rel-11, such collision is not a big problem, because it can be avoided by implementations at eNB. In the PRB pair containing PSS/SSS, eNB can schedule PDSCH using CRS as demodulation reference and therefore avoid transmitting DMRS. However, when it comes to LTE Rel-12, new carrier type (NCT) is discussed. On the NCT carrier, CRS is no longer used as demodulation reference and it is transmitted on single port (port 0) once per 5-ms to provide reference for time tracking. Therefore, only UE-specific DMRS is used as demodulation reference for both PDSCH and EPDCCH on NCT. Then the collision of PSS/SSS REs and DMRS REs in the PRB pair containing PSS/SSS becomes unavoidable. Because PSS/SSS is the common cell-specific signal, it has to be transmitted, which then blocks DMRS transmission on the colliding REs. This may result a significant degrade in PDSCH/EPDCCH performance especially when UE speed is not low.

SUMMARY

The above deficiencies and other problems associated with resource element collision are reduced or eliminated by the present application disclosed below. In some embodiments, the present application is implemented in a base station (also known as "eNB") that has one or more processors, memory and one or more modules, programs or sets of instructions stored in the memory for performing multiple functions. Instructions for performing these functions may be included in a computer program product configured for execution by one or more processors.

One aspect of the present application is a method of using synchronization signal as demodulation reference signal performed at an eNB in case that the demodulation reference signal is punctured by synchronization signal in a wireless communication network. The method comprises: determining whether there is a resource element collision between the demodulation reference signal and the synchronization signal; in accordance with a determination that there is a resource element collision between the two signals: using the synchronization signal as the demodulation reference signal in a PRB pair containing the synchronization signal; and transmitting the synchronization signal as the demodulation reference signal to a UE.

Another aspect of the present application is a base station including one or more processors, memory, and one or more program modules stored in the memory and executed by the one or more processors. The one or more program modules further including instructions for: a transmission module for determining whether there is a resource element collision between the demodulation reference signal and the synchronization signal; in accordance with a determination that there is a resource element collision between the two signals: using the synchronization signal as the demodulation reference signal in a PRB pair containing the synchronization signal; and transmitting the synchronization signal as the demodulation reference signal to a UE; and a signaling module for generating an information element, the information element defining a signal format relationship between the synchronization signal and the demodulation reference signal and transmitting the information element to the UE.

BRIEF DESCRIPTION OF DRAWINGS

For a better understanding, reference should be made to the following detailed description taken in conjunction with the accompanying drawings, in which.

Like reference numerals refer to corresponding parts throughout the drawings.

DETAILED DESCRIPTION

Figure 1:
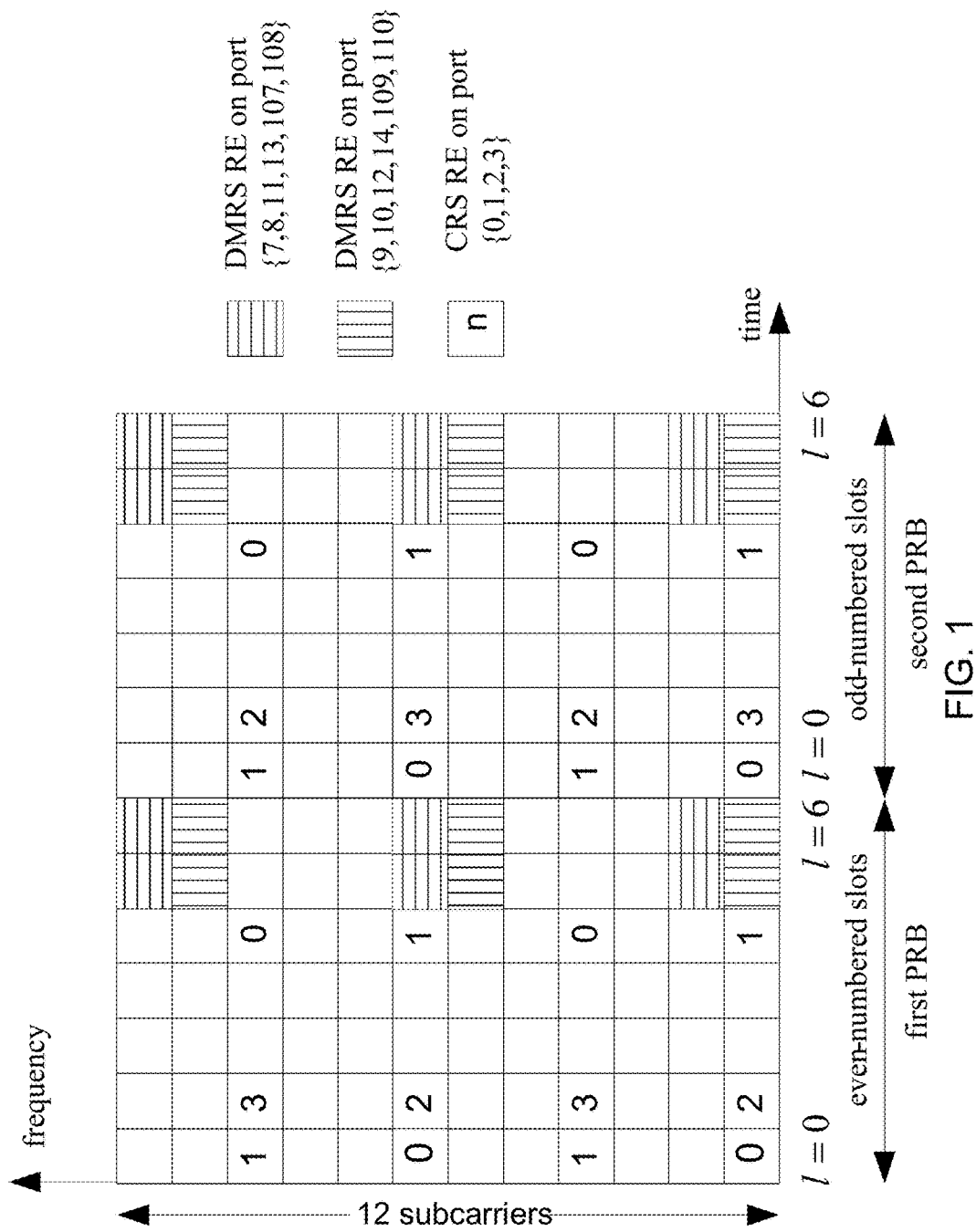
FIG. 1 is a block diagram illustrating LTE PSS/SSS allocation in one PRB pair.

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

As noted above, there is a collision issue between the synchronization signal resource elements and the reference signal resource elements in the PRB pair containing PSS and SSS. According to some embodiments of the present application, a method is proposed to extend the functionality of PSS/SSS by using them for demodulation reference in additional to their original function for initial cell synchronization and cell search. Assume following notations:

$N_T$: number of physical transmission antennas at eNB.

L: number of logical layers in DMRS-based PDSCH/EPDCCH transmission.

P: the $N_T$-by-L precoding matrix applied to PDSCH/EPDCCH.

$\vec{a}_{PSS/SSS}$: the row vector containing PSS/SSS signal RE values.

One aspect of the present application is to define new DMRS signals at the colliding REs, which are then converted into a set of modulation symbols that are to be mapped onto the subcarriers using a precoding matrix. Precoding involves multiplying a layer matrix including the new DMRS signals with the precoding matrix and creating the antenna port subcarrier values, which are sent to an OFDMA mapper and then the antenna ports. Once precoded with the same precoding matrix applied onto PDSCH/EPDCCH, the new DMRS signals become the PSS/SSS signals at those colliding REs on every physical transmission antenna, i.e., $$P \cdot (\text{new } DMRS \text{ on } L \text{ layers}) = \begin{pmatrix} \alpha_0 \cdot \vec{a}_{PSS/SSS} \\ \alpha_1 \cdot \vec{a}_{PSS/SSS} \\ \vdots \\ \alpha_{N_T-1} \cdot \vec{a}_{PSS/SSS} \end{pmatrix} \quad \text{Equation (1)}$$

where $\alpha_i$ ($0 \leq i < N_T$) is the precoded coefficient applied to i-th physical transmission antenna. It can be seen that the matrix on the right side of equation (1), which represents the PSS/SSS signals on $N_T$ transmission antennas, has rank equal to 1. Therefore only one out of L layers can utilize the PSS/SSS as demodulation reference signal. Because puncturing DMRS RE by PSS/SSS destroys the DMRS orthogonality with orthogonal code cover (OCC) equal to 4, only OCC=2 can be supported by non-punctured DMRS pair. This means L is up to 4. In other words, the PSS/SSS being used as demodulation reference can be on one of the ports in {7, 8, 9, 10} for PDSCH and one of the ports in {107, 108, 109, 110} for EPDCCH. In some embodiments, the PSS/SSS REs being used for demodulation reference are assigned onto port 7 for PDSCH and port 107 for EPDCCH, respectively. It should be noted that, because LTE Rel-10 DMRS precoding is performed per PRB pair, the use of PSS/SSS REs as demodulation reference is only applicable to the PRB pair containing the PSS/SSS REs.

With PSS/SSS REs used as demodulation reference on one DMRS port, the precoding operation on all demodulation reference signals is defined as:

$$P \cdot \begin{pmatrix} \vec{a}_{PSS/SSS} & \vec{a}_{DMRS,0} \\ 0 & \vec{a}_{DMRS,1} \\ \vdots & \vdots \\ 0 & \vec{a}_{DMRS,L-1} \end{pmatrix} = \begin{pmatrix} \alpha_0 \cdot \vec{a}_{PSS/SSS} \\ \alpha_1 \cdot \vec{a}_{PSS/SSS} \\ \vdots \\ \alpha_{N_T-1} \cdot \vec{a}_{PSS/SSS} \end{pmatrix} X \quad \text{Equation (2)}$$

where $\vec{a}_{DMRS,k}$ represents the row vector containing all non-punctured DMRS REs on the DMRS port associated with layer k, and sub-matrix X is the result of multiplication of P and all $\bar{a}_{DMRS,k}$. Here $\bar{a}_{PSS/SSS}$ is assigned on the DMRS port associated with layer 0 for description purpose; in principle $\bar{a}_{PSS/SSS}$ can be on any single DMRS port associated with any other layer. Note that the same precoding matrix P is applied to $\bar{a}_{PSS/SSS}$ and $\bar{a}_{DMRS,k}$ on the same DMRS port. In equation (2), for example, the same first column of the precoding matrix P is applied to $\bar{a}_{PSS/SSS}$ and $\bar{a}_{DMRS,k}$ for k=0. Because the same precoding is applied to $\bar{a}_{PSS/SSS}$ and $\bar{a}_{DMRS,k}$ on the same DMRS port, the UE can use both $\bar{a}_{PSS/SSS}$ and $\bar{a}_{DMRS,k}$ on the same DMRS port jointly for channel estimation.

Because EPDCCH is transmitted in a single layer and this single layer can be associated with any DMRS port in {107,108,109,110}, PSS/SSS can also be assigned on any port in {107,108,109,110} as demodulation reference for EPDCCH.

Figure 2:
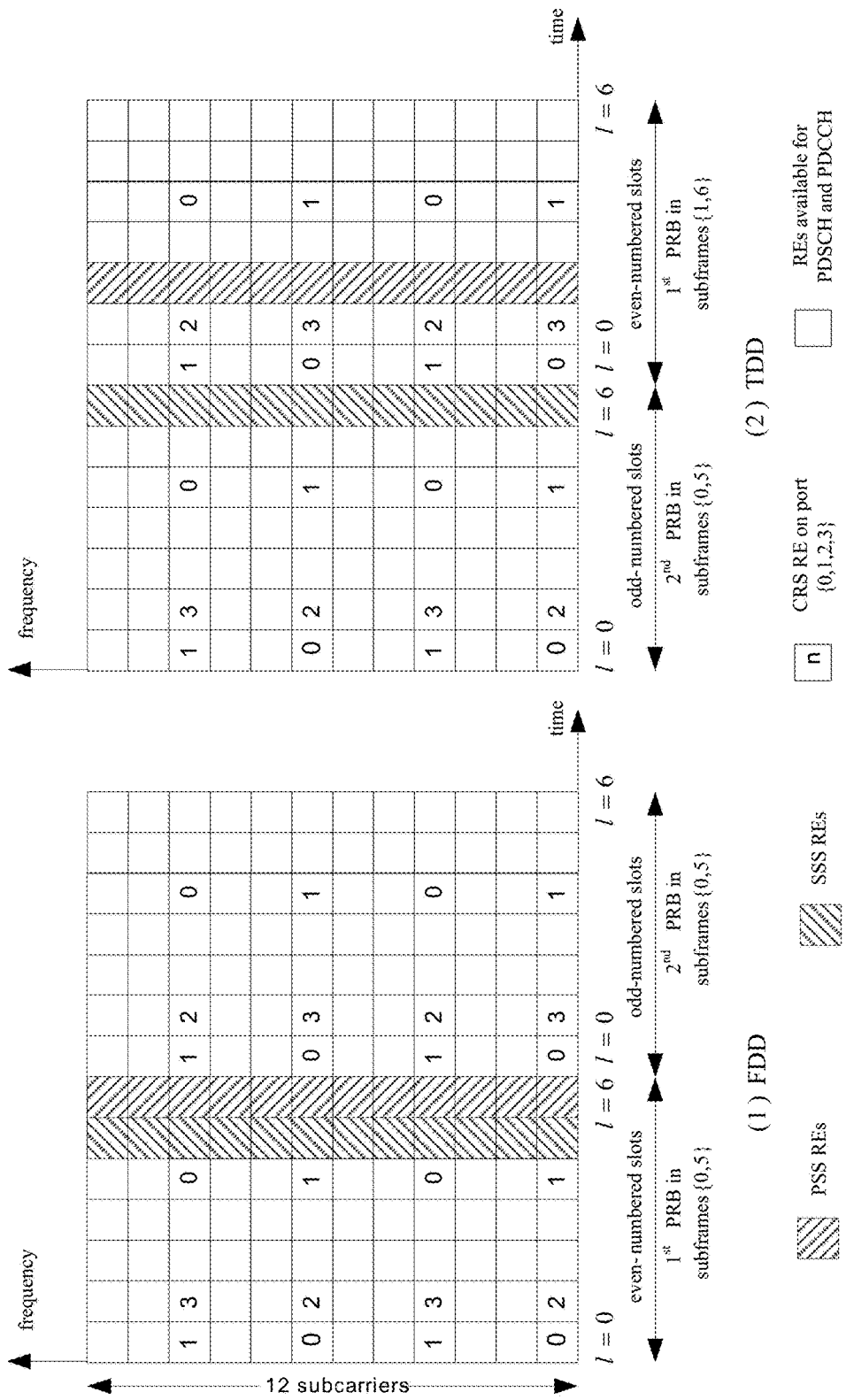
FIG. 2 is a block diagram illustrating LTE CRS/DMRS allocation pattern in one PRB pair.
Figure 3:
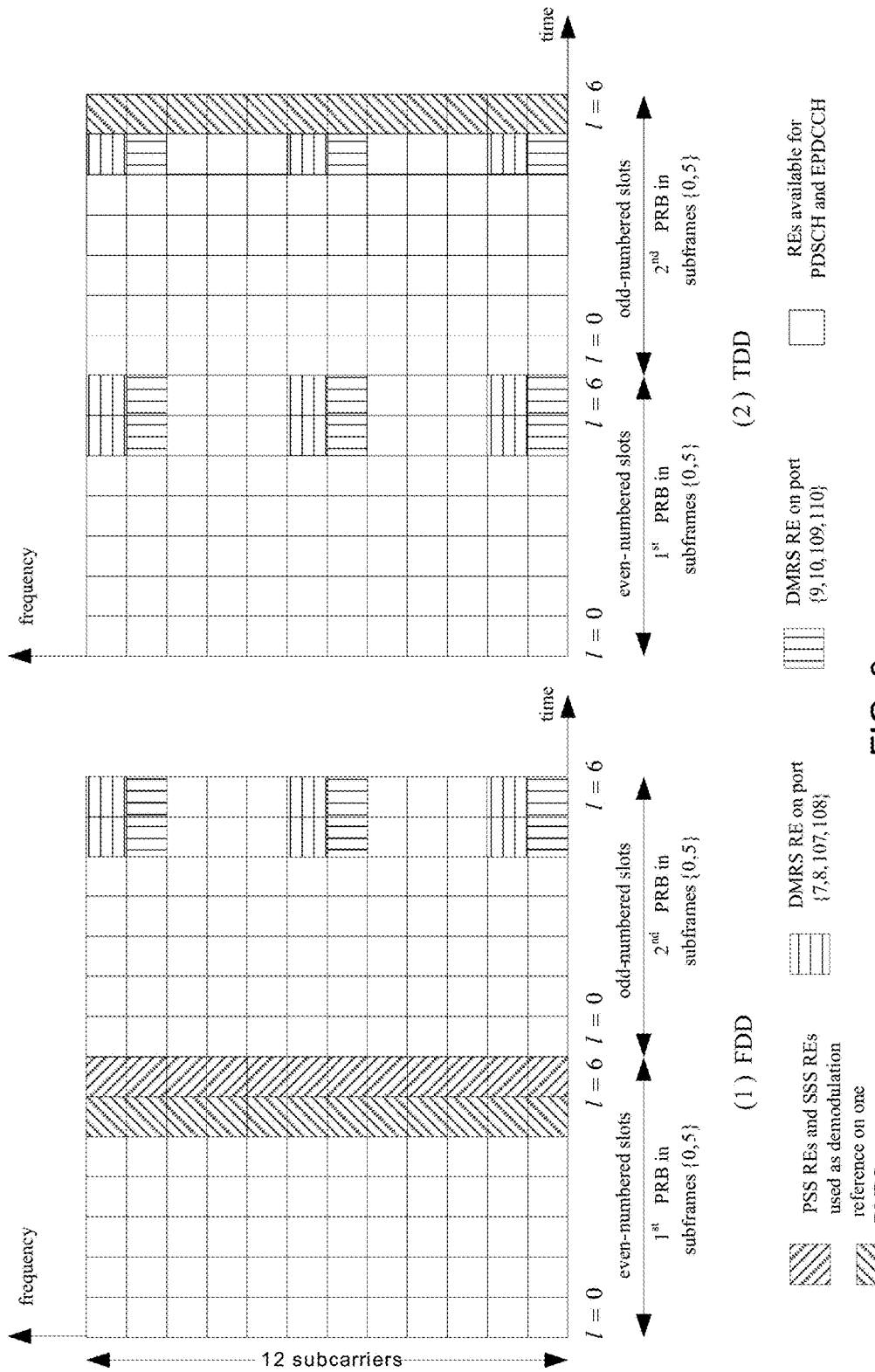
FIG. 3 is a block diagram illustrating that PSS/SSS REs in one PRB pair are used as demodulation reference according to some embodiments of the present application.

Although eNB keeps all PSS/SSS REs in one PRB pair on the same logical port as one DMRS port and makes all PSS/SSS REs being capable to provide demodulation reference, it does not necessarily mean that UE has to use all active PSS/SSS REs in the PRB pair as demodulation reference. But as shown in FIG. 3, UE may use all active PSS/SSS REs in one PRB pair as demodulation reference for better channel estimation performance. Moreover, the same demodulation reference RE locations shown in FIG. 2 are reused when using PSS/SSS as demodulation reference. This leads to the implementation in UE that only utilizes active PSS/SSS signal on the colliding REs as demodulation reference, which is shown in FIG. 4.

Figure 4:
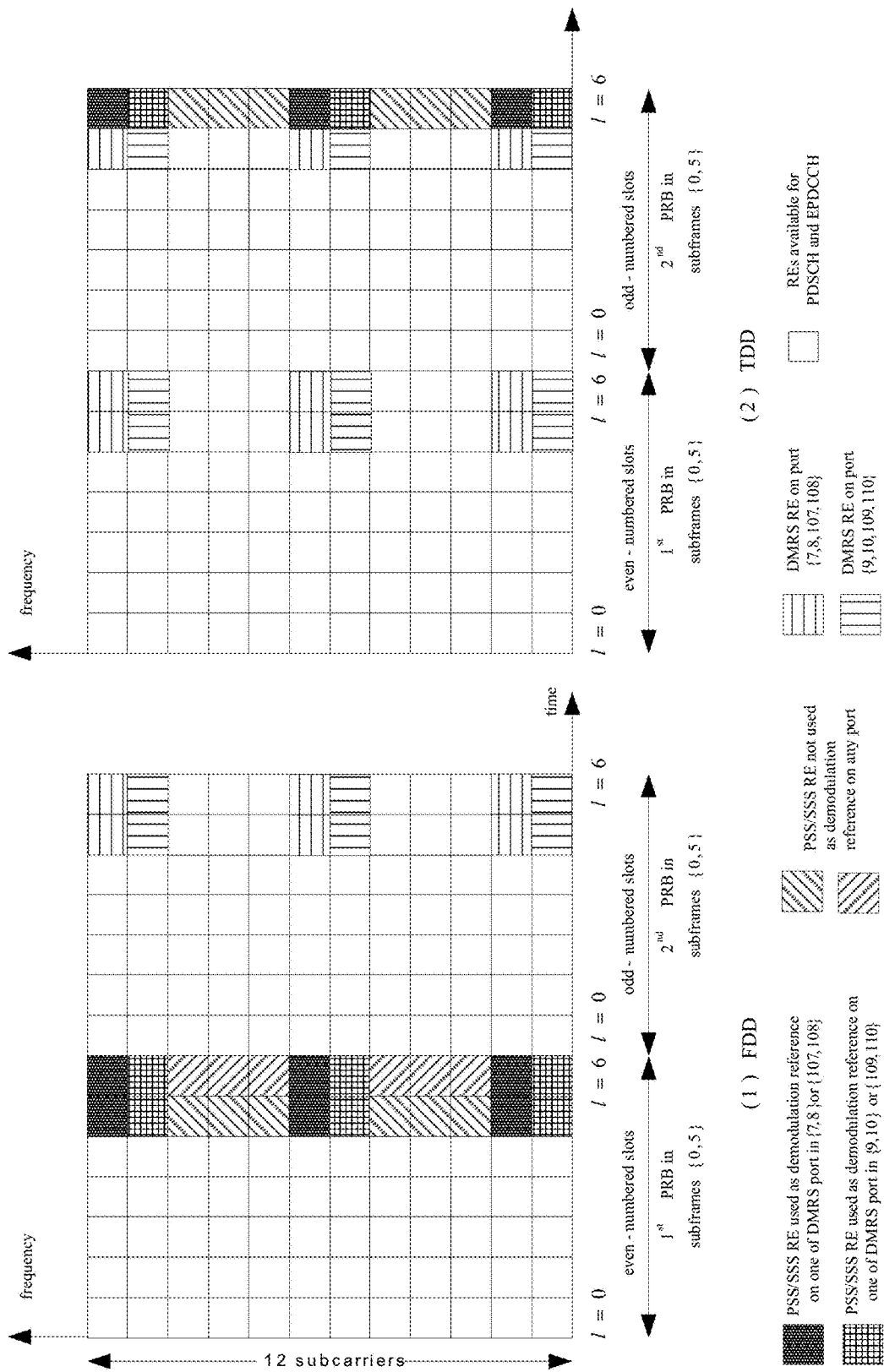
FIG. 4 is a block diagram illustrating that only the PSS/SSS REs on colliding RE locations in one PRB pair are used as demodulation reference according to some embodiments of the present application.
Figure 5:
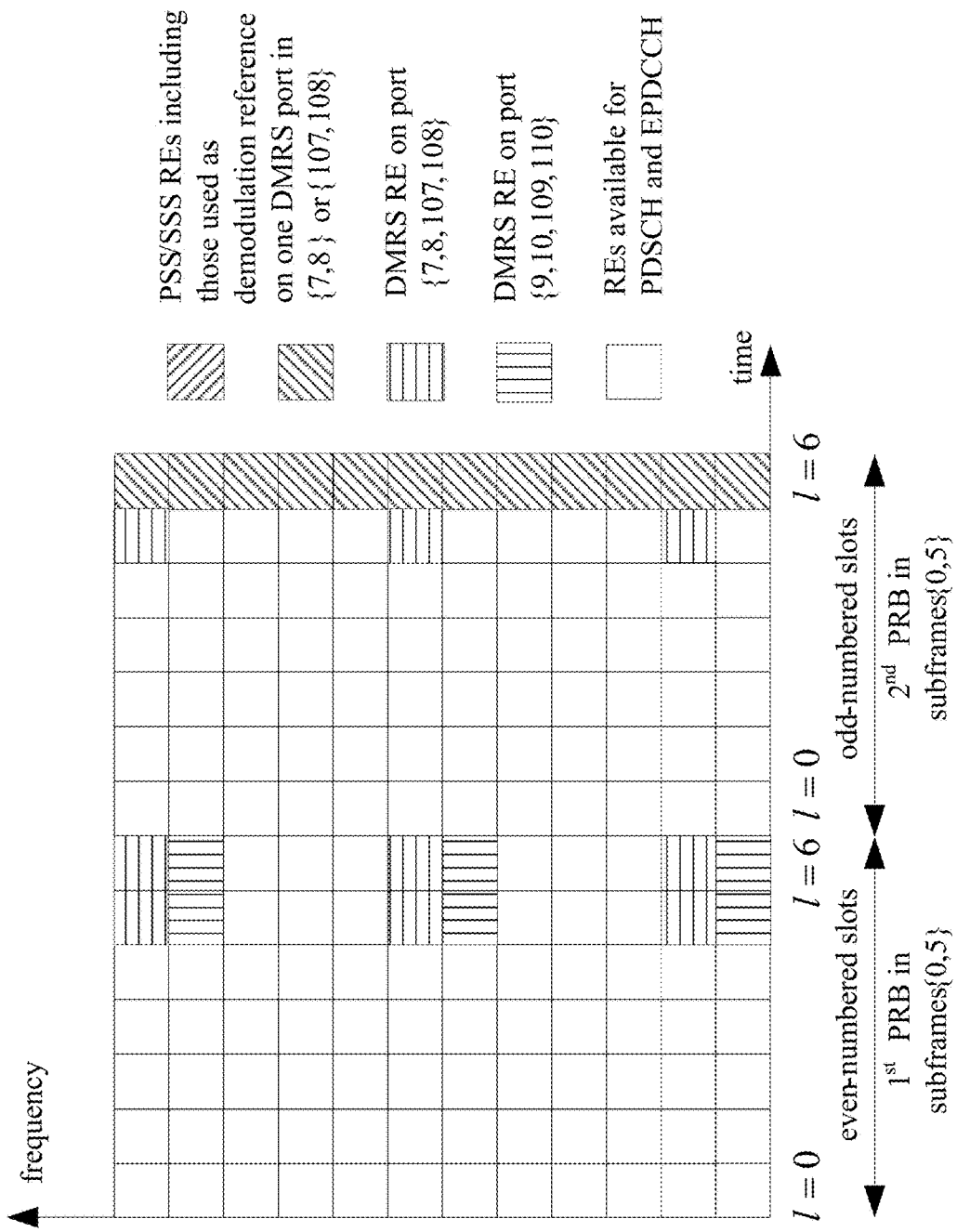
FIG. 5 is a block diagram illustrating one DMRS pattern in TDD with PSS/SSS to be used as demodulation reference on one port in {7, 8, 107, 108} according to some embodiments of the present application.
Figure 6:
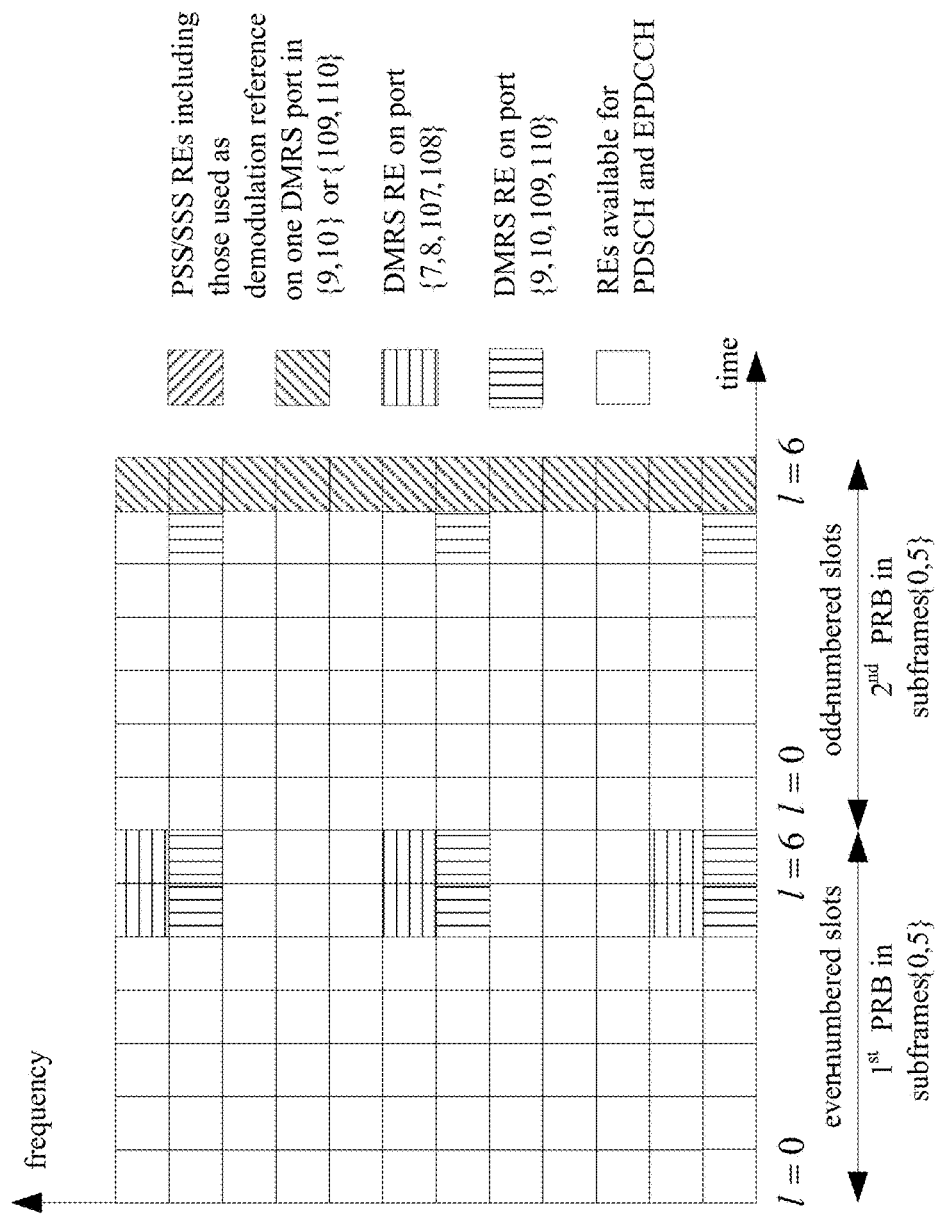
FIG. 6 is a block diagram illustrating one DMRS pattern in TDD with PSS/SSS to be used as demodulation reference on one port in {9, 10, 109, 110} according to some embodiments of the present application.

As shown in FIG. 4, for FDD, the puncturing of LTE Rel-10 DMRS by PSS/SSS occurs to a pair of adjacent DMRS REs in two adjacent time symbols, which means that the non-punctured LTE Rel-10 DMRS REs also remain in a pair of adjacent REs in FDD. But for TDD, the puncturing of LTE Rel-10 DMRS by SSS occurs only to the last OFDM symbol in the PRB pair, which leaves the LTE Rel-10 DMRS RE on the second to the last OFDM symbol unpaired. It is also reasonable to keep the LTE Rel-10 DMRS RE on the second to the last OFDM symbol only if that DMRS RE holds the DMRS signal on the same port as PSS/SSS that is used as demodulation reference. If the LTE Rel-10 DMRS RE on the second to the last OFDM symbol only holds the DMRS signal that is on the antenna port different from PSS/SSS that is used as demodulation reference, such LTE Rel-10 DMRS RE is not transmitted and its RE location is saved to transmit PDSCH/EPDCCH. Such resource allocation is depicted in FIG. 5 and FIG. 6, respectively. For example, FIG. 5 depicts one DMRS pattern in TDD with PSS/SSS to be used as demodulation reference on one port in {7, 8, 107, 108}. RE locations "A," "B," and "C" are reserved for transmitting PDSCH/EPDCCH. FIG. 6 depicts another DMRS pattern in TDD with PSS/SSS to be used as demodulation reference on one port in {9, 10, 109, 110}. RE locations "D," "E," and "F" are reserved for transmitting PDSCH/EPDCCH.

Figure 7:
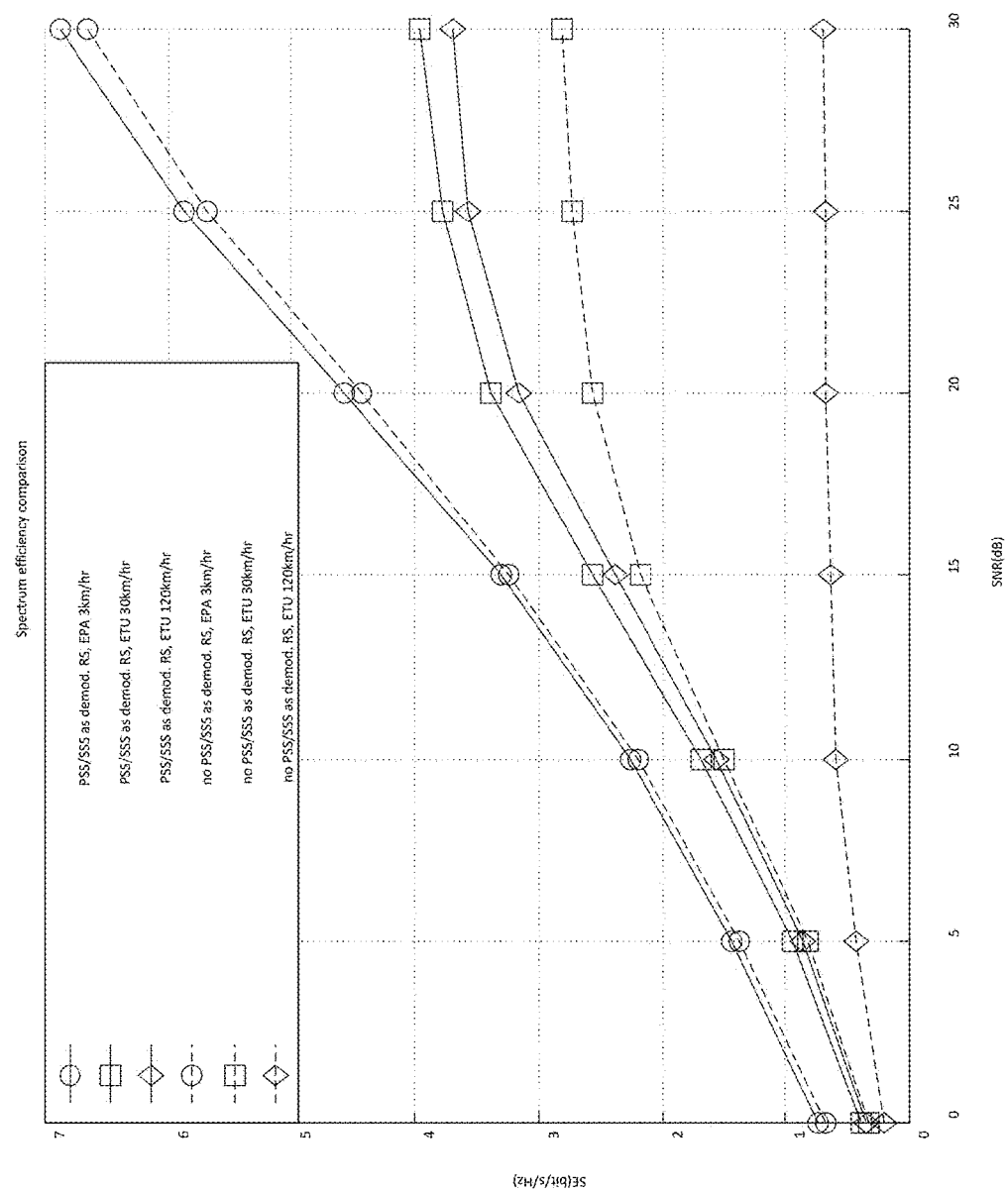
FIG. 7 is a block diagram illustrating the performance comparison between using and not using PSS/SSS as demodulation reference according to some embodiments of the present application.
Figure 8:
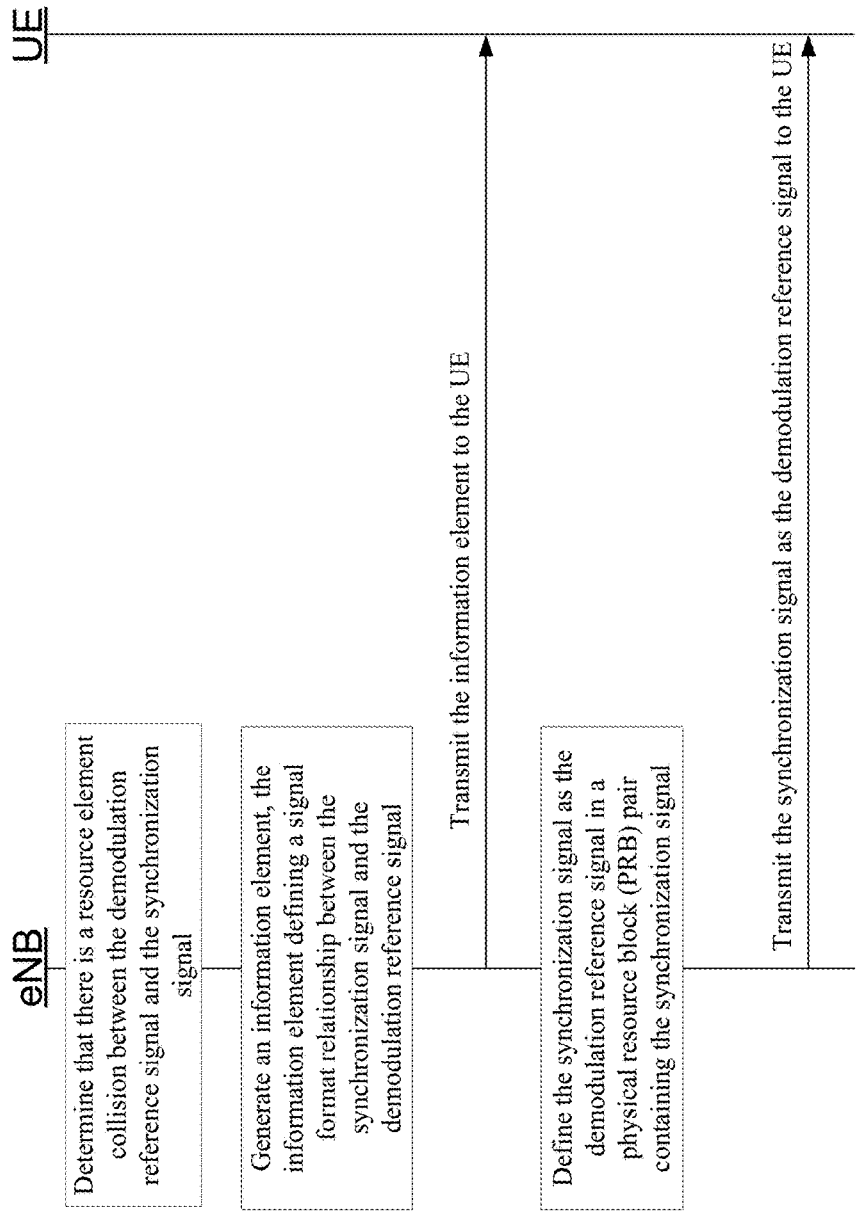
FIG. 8 is a block diagram illustrating the preparation and transmission of an information element and a synchronization signal from the eNB to the UE.

Performance comparison is provided in FIG. 7 between using PSS/SSS as demodulation reference and not using PSS/SSS as demodulation reference. It can be seen that a gain is achieved by using PSS/SSS as demodulation reference. As shown in the figure, this gain is more significant especially when UE's moving speed is high.

There are several issues related to using PSS/SSS as demodulation reference. First, PSS/SSS signal is generated using a cell-specific parameter, e.g., PCID, which is unique per eNB. But since the LTE Rel-10 DMRS supports coordinated multiple point transmission (CoMP), it can be transmitted from multiple eNBs to the same UE either at the same time or at the different instances. Without knowing the PCID beforehand, the UE in the CoMP operation may not be able to know exactly which eNB is the actual transmitter at a given time and determine that which PCID is applied to the PSS/SSS that is used as demodulation reference signal. Therefore, additional signaling is needed to inform UE of PCID to be applied to the PSS/SSS. According to some embodiments, one solution to this problem is as follows:

If only one PCID is signaled to UE, the PSS/SSS used as demodulation reference for PDSCH and EPDCCH is always generated from the eNB having that PCID.

If multiple PCIDs are signaled to UE for EPDCCH demodulation reference, each PCID being associated with one member of an EPDCCH candidate set, every EPDCCH reception in the EPDCCH candidate set should apply the PCID associated with that EPDCCH candidate set to generate PSS/SSS as demodulation reference.

If multiple PCIDs are signaled to UE for PDSCH demodulation reference, one additional dynamic selection indicator is signaled to UE on the downlink control channel to inform UE of which PCID is applied to generate the PSS/SSS as demodulation reference for PDSCH. Such dynamic selection indicator can use existing bits in the downlink control channel, such as NDI bit, $n_{SCID}$ bit or the combination of the two.

If no PCID is signaled to UE, the PCID of UE's current serving cell is applied to generate PSS/SSS as demodulation reference for PDSCH and EPDCCH.

In some embodiments, there is a power offset between PSS/SSS RE and LTE Rel-10 DMRS RE in the same PRB pair. When used as demodulation reference signal for a particular UE, PSS/SSS is still the common signal serving synchronization and cell search for the UEs in the entire cell. Therefore the PSS/SSS is normally transmitted with high power. If there is a power offset between the PSS/SSS RE and LTE Rel-10 DMRS RE on the same port and in the same PRB pair, which is not known to UE, the UE then has to assume the equal power, resulting in a reduced channel estimation accuracy. Therefore, the power offset should be made known to the UE side. According to some embodiments, one solution to this problem is as follows:

If no power offset is signaled to UE, the pre-defined power offset value should be used as the power offset between PSS/SSS RE power and LTE Rel-10 DMRS RE power over all layers for PDSCH and EPDCCH. For simplicity purpose, this pre-defined power offset can be 0 dB, which means equal power between the two.

If one power offset is signaled to UE, it is applied as power offset between PSS/SSS RE power and LTE Rel-10 DMRS RE power over all layers for PDSCH and EPDCCH.

If multiple power offsets are signaled to UE, UE needs to be prepared to receive PSS/SSS as demodulation reference from multiple eNBs. As described above in connection with PCID, For EPDCCH transmission, each of the multiple power offsets is associated with one member of an EPDCCH candidate set. Every EPDCCH reception in the EPDCCH candidate set should assume that the corresponding power offset is applied between PSS/SSS RE and LTE Rel-10 DMRS RE.

For PDSCH transmission, one additional dynamic selection indicator is signaled to UE on the downlink control channel to inform UE of which power offset is applied. Such dynamic selection indicator can use existing bits in the downlink control channel, such as NDI bit, $n_{SCID}$ bit or the combination of the two.

In some embodiments, an on-off switch indication is signaled to UE as a simple control mechanism to enable/disable the feature of using PSS/SSS as demodulation reference. In order to support the on-off control for each EPDCCH candidate set, multiple on-off switch indications is signaled to UE, each of the multiple indications being associated with one member of an EPDCCH candidate set. Meanwhile, multiple on-off switch indications can be signaled to the same UE in order to support the feature of using PSS/SSS as demodulation reference for PDSCH in CoMP operation. One dynamic selection indicator is also signaled to UE via the downlink control channel to inform UE of which on-off switch indication is selected for upcoming PDSCH demodulation.

In some embodiments, the on-off switch indications on EPDCCH and PDSCH are transmitted together with multiple PCIDs and power offsets signaled to UE as described above. For example, one information element (IE) can be defined to include following pieces of information:
 a) on-off switch indication;
 b) PCID applied to generate PSS/SSS that is used as demodulation reference;
 c) Power offset between PSS/SSS used as demodulation reference and LTE Rel-10 DMRS transmitted in the PRB pair containing the PSS/SSS.

With this data structure of information element,
For EPDCCH transmission, multiple information elements are signaled to UE, each of which being associated with one member of an EPDCCH candidate set; and
For PDSCH transmission, multiple information elements are signaled to UE, each of which being associated with one member of an EPDCCH candidate set. In addition, one dynamic selection indicator is also signaled to UE via the downlink control channel to inform UE of which information element is selected for the upcoming PDSCH demodulation.

For each information element that is selected in the EPDCCH candidate set monitoring and/or PDSCH demodulation, the on-off switch indication in the information element determines whether PSS/SSS should be used as demodulation reference.

If the on-off switch is no, the rest of information contained in the information element should be ignored.
If the on-off switch is yes, the PCID contained in the information element is applied to generate PSS/SSS that is used as demodulation reference, and the power offset contained in the information element is applied as the power offset between PSS/SSS and DMRS transmitted in the PRB pair containing PSS/SSS.

In some other embodiments, the three pieces of information (on-off switch indication, PCID and power offset) may not be all defined in the practice of LTE specification. In implementation, the above described methods and their variations may be implemented as computer software instructions or firmware instructions. Such instructions may be stored in an article with one or more non-transitory machine-readable storage devices connected to one or more computers or integrated circuits or digital processors such as digital signal processors and microprocessors. In a communication system, the signaling flow and process relating to PSS/SSS, PCID and power offset may be implemented in form of software instructions or firmware instructions for execution by a processor in the transmitter and receiver or the transmission and reception controller. In operation, the instructions are executed by one or more processors to cause the transmitter and receiver or the transmission and reception controller to perform the described functions and operations. Other variations and enhancements are possible based on what is mentioned here.

The above disclosures are merely preferred implementations of the present application, but are not intended to limit the scope of the claims of the present application. Any equivalent change made according to the claims of the present application modification still falls within the scope of the present application.

While particular implementations are described above, it will be understood it is not intended to limit the present application to these particular implementations. On the contrary, the present application includes alternatives, modifications and equivalents that are within the spirit and scope of the appended claims Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the present application herein is for the purpose of describing particular implementations only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the present application to the precise forms disclosed. Many modifications and variations are possible in view of the above teachings. The implementations were chosen and described in order to best explain principles of the present application and its practical applications, to thereby enable others skilled in the art to best utilize the present application and various implementations with various modifications as are suited to the particular use contemplated. Implementations include alternatives, modifications and equivalents that are within the spirit and scope of the appended claims Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. For use in a wireless communication network, a method for an eNodeB (eNB) to use a synchronization signal as a demodulation reference signal, the method comprising:
   determining that there is a resource element collision between the demodulation reference signal and the synchronization signal;
   in accordance with a determination that there is a resource element collision between the two signals:
      generating an information element, the information element defining a signal format relationship between the synchronization signal and the demodulation reference signal, wherein the information element includes at least one of an on-off switch indication, one and only one physical cell identification (PCID), and a power offset between the synchronization signal and the demodulation reference signal, and the synchronization signal is assumed to be generated from an eNB having that PCID for both physical downlink shared channel (PDSCH) and enhanced physical downlink shared channel (EPDCCH) transmission;
      transmitting the information element to a user equipment (UE);
      using the synchronization signal as the demodulation reference signal in a physical resource block (PRB) pair containing the synchronization signal; and
      transmitting the synchronization signal as the demodulation reference signal to the UE.

2. The method of claim 1, wherein the on-off switch indication indicates whether the synchronization signal can be used as the demodulation reference signal by the UE.

3. The method of claim 1, wherein, when no power offset is transmitted to the UE, the synchronization signal and the demodulation reference signal are deemed to have equal power.

4. The method of claim 1, wherein, when one power offset is transmitted to the UE, the power offset is applied to the demodulation reference signal and the synchronization signal over all layers for both PDSCH and EPDCCH transmissions.

5. The method of claim 1, wherein the synchronization signal is used as the demodulation reference signal on one logical antenna port.

6. The method of claim 5, wherein the logical antenna port is port 107 for EPDCCH transmission.

7. The method of claim 1, wherein the synchronization signal is used as the demodulation reference signal on one of four logical antenna ports {107,108,109,110} for EPDCCH transmission.

8. The method of claim 5, wherein the logical antenna port is port 7 for PDSCH transmission.

9. For use in a wireless communication network, a method for an eNB to use a synchronization signal as a demodulation reference signal, the method comprising:
   determining that there is a resource element collision between the demodulation reference signal and the synchronization signal;
   in accordance with a determination that there is a resource element collision between the two signals:
      generating an information element, the information element defining a signal format relationship between the synchronization signal and the demodulation reference signal, wherein the information element includes at least one of an on-off switch indication, multiple PCIDs, each PCID being associated with one member of an EPDCCH candidate set, and a power offset between the synchronization signal and the demodulation reference signal, and the synchronization signal is assumed to be generated from an eNB having that PCID associated with the corresponding EPDCCH candidate set for the EPDCCH transmission;
      transmitting the information element to a UE;
      using the synchronization signal as the demodulation reference signal in a physical resource block (PRB) pair containing the synchronization signal; and
      transmitting the synchronization signal as the demodulation reference signal to the UE.

10. The method of claim 9, wherein, when multiple power offsets are transmitted to the UE and each of the multiple power offsets is associated with one member of an EPDCCH candidate set, each power offset is applied to the demodulation reference signal and the synchronization signal for the corresponding member of the EPDCCH candidate set for the EPDCCH transmission.

11. For use in a wireless communication network, a method for an eNB to use a synchronization signal as a demodulation reference signal, the method comprising:
   determining that there is a resource element collision between the demodulation reference signal and the synchronization signal;
   in accordance with a determination that there is a resource element collision between the two signals:
      generating an information element, the information element defining a signal format relationship between the synchronization signal and the demodulation reference signal, wherein the information element includes at least one of an on-off switch indication, multiple PCIDs for PDSCH transmission, and a power offset between the synchronization signal and the demodulation reference signal;
      transmitting the information element to a UE, wherein a dynamic selection indicator is transmitted to the UE via a downlink control channel to inform the UE of which of the multiple PCIDs is applied to generate the synchronization signal for the PDSCH transmission;

using the synchronization signal as the demodulation reference signal in a physical resource block (PRB) pair containing the synchronization signal; and transmitting the synchronization signal as the demodulation reference signal to the UE.

12. The method of claim 11, wherein the dynamic selection indicator is one existing bit in the downlink control channel comprising at least one of new data indicator (NDI) bit, $n_{SCID}$ bit or a combination of the two.

13. The method of claim 11, wherein, when multiple power offsets are transmitted to the UE, a dynamic selection indicator is transmitted to the UE via a downlink control channel to inform UE of which of the multiple power offsets is applied to the demodulation reference signal and the synchronization signal for the PDSCH transmission.

* * * * *